Jan. 4, 1927.

H. A. PALMER 1,613,528

ROTARY ENGINE

Filed August 25, 1925    5 Sheets-Sheet 1

Fig.1.

Harry A. Palmer, INVENTOR.

BY

Geo. P. Kimmel, ATTORNEY.

Jan. 4, 1927. 1,613,528
H. A. PALMER
ROTARY ENGINE
Filed August 25, 1925 5 Sheets-Sheet 5

Harry A. Palmer, INVENTOR.

BY

Geo. P. Kimmel, ATTORNEY.

Patented Jan. 4, 1927.

1,613,528

UNITED STATES PATENT OFFICE.

HARRY A. PALMER, OF BOSTON, MASSACHUSETTS, ASSIGNOR OF TWENTY-FIVE PER CENT TO JOHN J. KELLY, TWENTY-FIVE PER CENT TO WILLIAM A McKAY, AND TWO PER CENT TO JAMES A. McCARTHY, ALL OF BOSTON, MASSACHUSETTS.

ROTARY ENGINE.

Application filed August 25, 1925. Serial No. 52,379.

This invention relates to rotary engines, of the internal combustion, multi-cylinder type, and has for its object to provide in a manner as hereinafter set forth, an engine of the class referred to, with a series of radially disposed driving elements of the internal combustion type and means whereby each of said elements is so governed as to provide for a series of impulses therefrom during each revolution of the engine, thereby materially increasing the speed and power of the latter and owing to the multiplicity of the impulses in each revolution its weight is materially less than that now necessary to develop equal amount of horse power.

Further objects of the invention are to provide, in a manner as hereinafter set forth, a rotary engine of the class referred to, which is comparatively simple in its construction and arrangement, strong, durable, compact, thoroughly efficient in its use, readily assembled, and comparatively inexpensive.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Referring to the drawings in detail, 1 denotes a base provided with a pair of vertical standards 2, 3, which are spaced a suitable distance from each other and each of which is provided at its upper end with an annulus. The annulus at the upper end of the standard 2 is indicated at 4 and is of materially greater outer and inner diameter than the annulus 5 at the upper end of the standard 3. The standards 2 and 3 are provided for supporting a stationary shaft 6, which forms an element of a rotary engine construction in accordance with this invention. It is to be understood that any suitable means can be employed as a support for the shaft. Within the annulus 4 is positioned a bearing means 7 for the periphery of one of the sections of the power transmitting shaft of the engine and which will be presently referred to.

The stationary shaft 6 acts as a means for supporting a coerce member 8 to be hereinafter more specifically referred to.

The shaft 6 also acts as a support for a pair of opposite disposed combined guide and holding members 9, 10, to be hereinafter more specifically referred to, a pair of spaced bearing elements 11, 12, a pair of spaced bearing elements 13, 14, and a pair of spaced bearing elements 15, 16. The specific function, as well as the arrangement of the pairs of bearing elements will be hereinafter more specifically referred to. The coerce member 8 and holding members 9 and 10 are keyed to the shaft 6, as at 16', and the coerce member 8 is interposed between the holding members 9 and 10 as well as being fixedly secured therewith by the hold-fast devices 17. The shaft 6 for a portion of its length is solid and its remaining portion hollow. The solid portion is indicated at 18 and the hollow portion at 19. The coerce and holding members are keyed to the solid portion 18 at a point between its transverse center and the inner end of the hollow portion 19, and the latter forms an inlet channel 20 for the supply of an explosive mixture. The channel 20 communicates with a carbureter, not shown, by a feed pipe 21. The inner terminal part of the hollow portion 19 of the shaft 6 is provided with a plurality of outlet ports 22 for the channel 20.

A rotary engine, in accordance with this invention, includes a revoluble polygonal-shaped casing, preferably pentagonal in contour, and each side of the body portion thereof carries a driving element, and although the preferred shape of the casing is pentagonal in contour, yet the shape thereof can be of other polygonal contour to increase or decrease the number of driving elements employed.

The casing comprises a body portion referred to generally by the reference character 23, and which as shown is formed with five sides 24, 25, 26, 27 and 28. The casing further includes a pair of heads 29 and 30. The former is integral with the body portion 23 and the latter is removably connected with the body portion 23 by the hold-fast devices 31. The heads 29 and 30 are of a contour to project away from the body portion 23 in opposite directions and each of which inclines from its axis towards the body portion 23.

The power transmitting shaft of the engine is formed of two sections, extending in opposite directions with respect to each other, and further arranged in opposed, spaced relation. One of the sections is indicated at 32 and the other at 33. The sections 32 and 33 are formed integral respectively with the heads 29, 30, and each of said sections extends inwardly of and with respect to that head with which it is formed integral. Each of said shaft sections is formed with a closed inner end 34 and an open outer end. The shaft section 32 surrounds the portion 18 of the shaft 6, and the shaft section 33 surrounds a part of the portion 18 and the inner part of the portion 19 of the shaft 6. The power is transmitted preferably from the section 32 and which may be of any suitable length. The bearing means 7 is provided for the section 32. The bearing elements 14 and 15 are arranged within the section 32 and maintained in position by peripherally threaded collars 35, 36 respectively. The bearing element 14 is arranged within the section 32 at the inner end thereof, and the bearing element 15 in proximity to the outer end and said section 33 is provided with threads which are engaged by the retaining collars 35 and 36 for the packings 35′ and disks 36′. The bearing elements 13 and 16 are arranged within the section 33 and are maintained in position by the retaining collars 37 and 38 respectively in connection with the packings 37′ and disks 38′. The collars 37 and 38 are peripherally threaded and engage with threads formed on the inner face of the section 33. The bearing element 16 is spaced a substantial distance from the collar 37 to provide, in connection with the section 33, an inlet chamber 39 for the combustible mixture, and the said ports 22 open in the chamber 39. The inner ends of the shaft sections 32 and 33 are tapered and the former opposes and is spaced from the holding member 9, and the latter opposes and is spaced from the holding member 10. The bearing element 11 is interposed between the holding member 10 and the inner end of the section 33, and the bearing element 12 is interposed between the inner end of the section 32 and the holding member 9.

As each of the walls of the body portion 23 is of the same construction, but one will be described, as the description of one will apply to the other. Each of said walls is formed centrally of its outer face with a circular boss 40 of a diameter to snugly engage the inner face of the cylinder of a driving element, to be presently referred to. The wall centrally is provided with a pocket 41 opening at the inner face of the wall. The pocket 41 extends into the boss 40 and the latter centrally thereof has an opening 42 of less diameter than the diameter of the pocket 41 and which communicates with the latter. The wall at one side of the pocket 41 is provided with a port 43. The body portion 23 of the casing, in connection with the heads 29 and 30 thereof, as well as the sections 32, 33 of the power transmitting shaft, provides a lubricant and a combustible charge distributing chamber 44, and the ports 43 form outlets for said chamber 44.

The coerce member 8, as well as the holding members 9 and 10, is arranged centrally of the chamber 44, and said coerce 8 consists, as shown, of a triangular-shaped plate having its edge upon a plurality of arcs of a circle. Certain of the arcs are of convex curvature, as indicated at 45, and the other of concave curvature, as indicated at 46. The portions of the edges of the coerce which are of convex curvature are alternately disposed with respect to those portions 46 upon a concave curvature. The portions of the edge of the coerce which are of convex curvature are upon a greater arc than the portions thereof upon a convex curvature. The curvature of the edge of the coerce 8 governs the operation of the pistons of the driving elements to be presently referred to. The holding members 9 and 10 are of the same contour as the shape of the coerce 8, but said holding members are of greater width and height than the width and height of the coerce whereby the members will project beyond the curved edge of the coerce. The coerce 8, as well as the members 9 and 10, is provided centrally with an opening 47 for the passage of the shaft 6. That portion of the inner face of each of the holding members which projects beyond the edge of the coerce 8 is formed with a guide groove 48, which corresponds in curvature to that of the edge of the coerce. The shape of the coerce 8 is such as to provide for three impulses from each driving element during one revolution of the casing, or in other words the coerce in connection with the holding members 9 and 10 governs the operation of each driving element so that during each revolution of the casing three impulses will be obtained from each driving element.

Fixedly secured to the inner face of each of the walls of the body portion 23 are two pairs of spaced guide rods. The guide rods of one pair are indicated at 49, 50 and the guide rods of the other pair at 51, 52. The guide rods of one pair oppose the guide rods of the other pair, and the coerce 8 and holding members 9, 10 extend between the pairs of opposed guide rods. The guide rods 49, 50, which project from one of the walls of the body portion 23 are connected to the guide rods 50, 49, carried by an adjacent wall by the coupling unions 52', 53, respectively, and the guide rods 51, 52 which project inwardly from one wall of the body portion 23 are connected respectively to the guide rods 52, 51, which project from an adjacent wall by the coupling unions 54. The coupling unions are arranged at the inner ends of the guide rods. The guide rods of each pair oppose each other and are of the same length.

As the body portion of the casing 23 is illustrated as provided with five walls, five driving elements are employed and which are indicated generally by the reference characters 56, 57, 58, 59 and 60. As each of the driving elements is of the same construction, but one will be described as the description of one will apply to the others. Each of the driving elements is of the internal combustion two-cycle type, and consists of a cylinder 61 having an open inner end and closed outer end. The cylinder 61, intermediate its ends and at diametrically disposed points, is formed with an inlet 62 and an outlet 63. The closed outer end of the cylinder 61 has mounted therein a spark plug 64. The cylinder 61, at its inner end is formed with a laterally extending annular flange 65, having a port 66, which registers with the port 43. The ports 43 and 66 form an intake for the combustion charge to a supply passage 67 which leads to an inlet 62. The passage 67 is provided by an offset portion 68 which is integral with the cylinder and flange 65. The intake formed by the ports 43 and 66 is controlled by a check valve 69. The cylinder 61 is seated against the wall of the body portion 23 and snugly engages as well as surrounds the boss 40. Extending through the flange 65 are hold-fast devices 70 for fixedly securing the cylinder 61 to its respective wall. The cylinder 61 is provided with an opening 61' which communicates with the passage 67.

Figure 1:
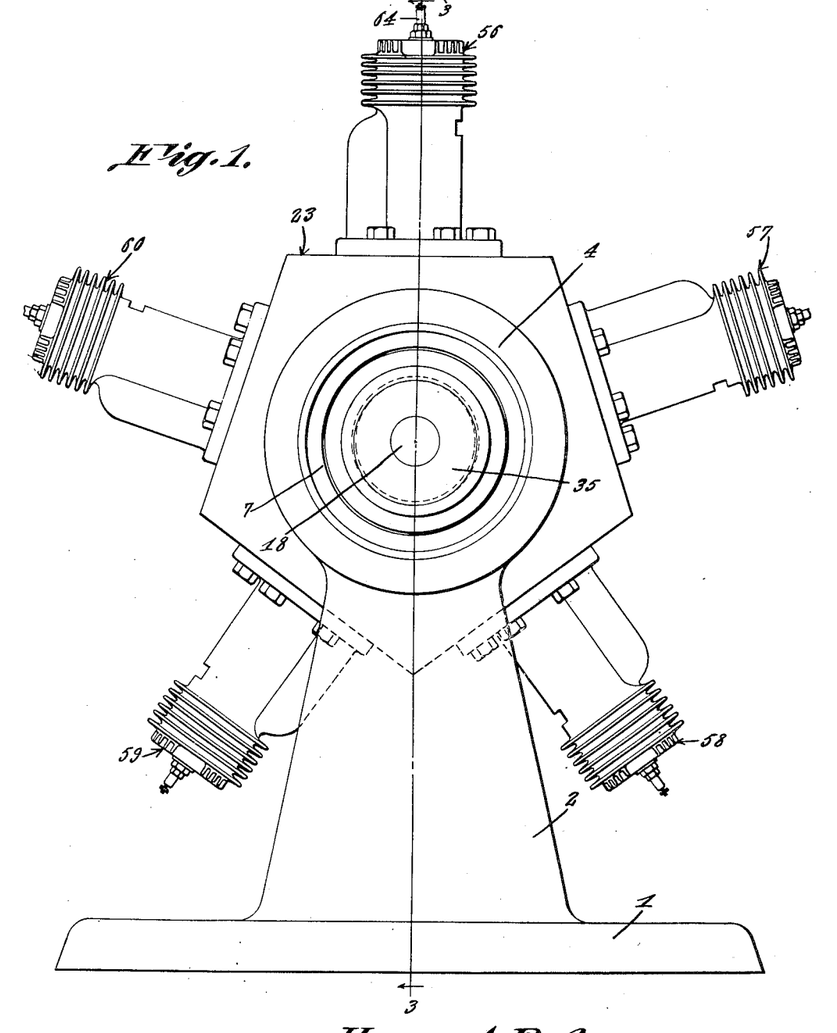
Figure 1 is an end elevation of a rotary engine, in accordance with this invention.
Figure 2:
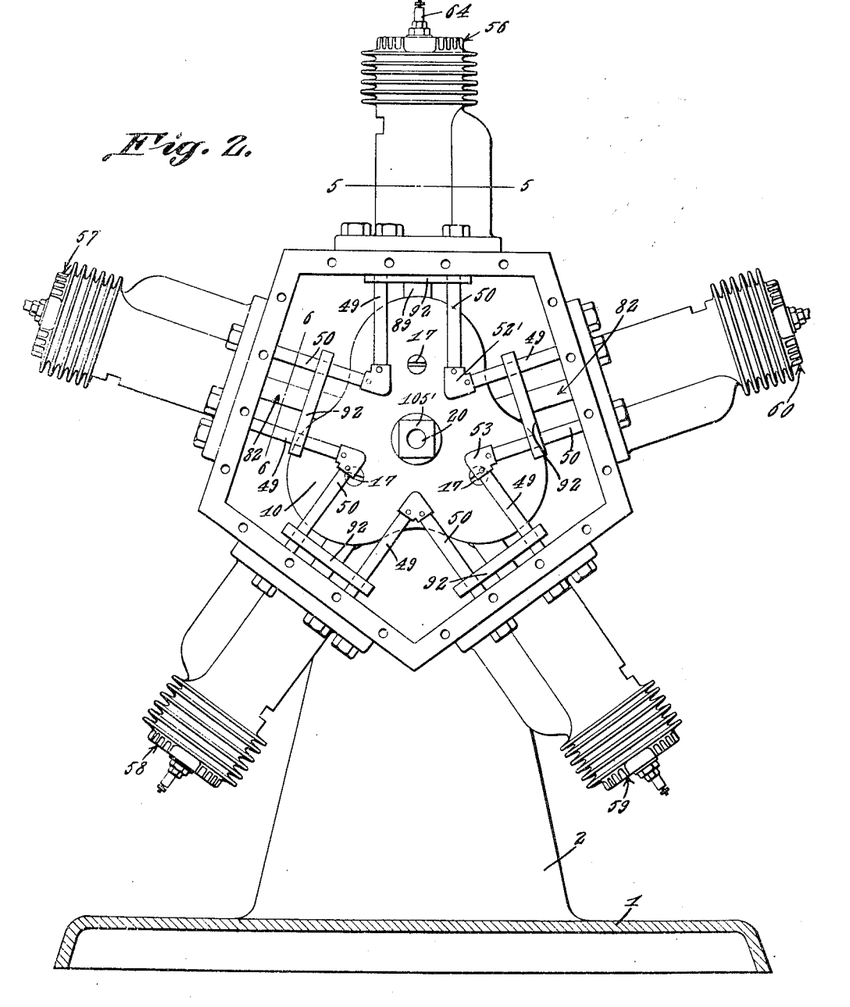
Figure 2 is a similar view with the closure head removed from one end of the engine casing.
Figure 3:
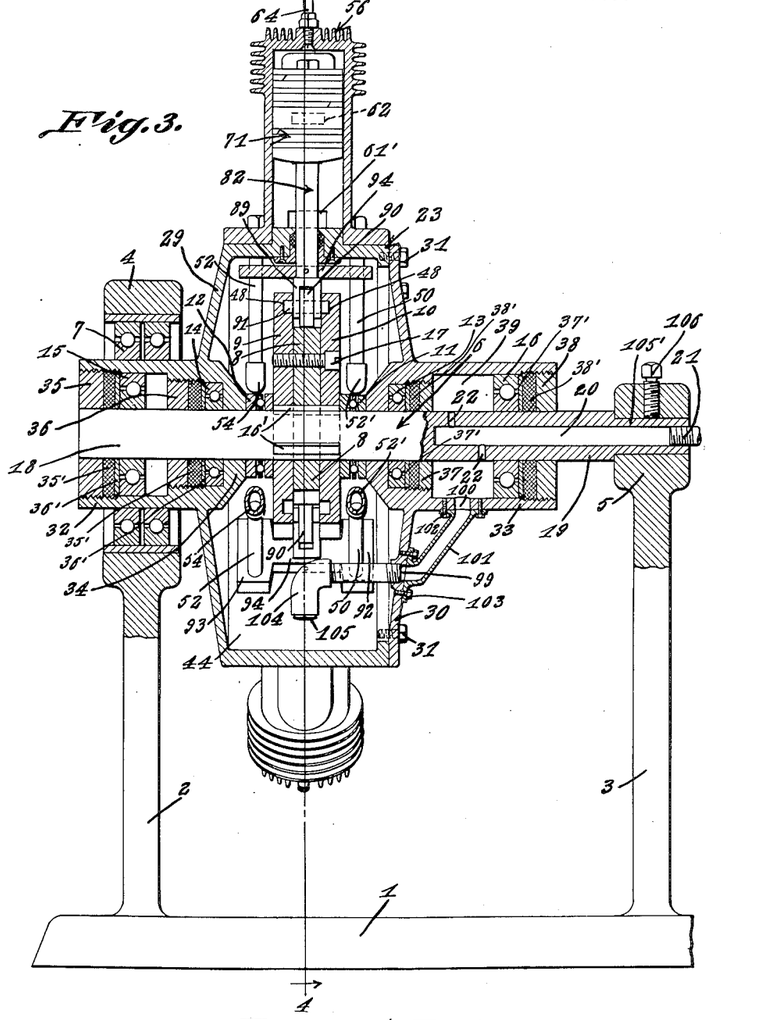
Figure 3 is a longitudinal sectional view of the engine.
Figure 4:
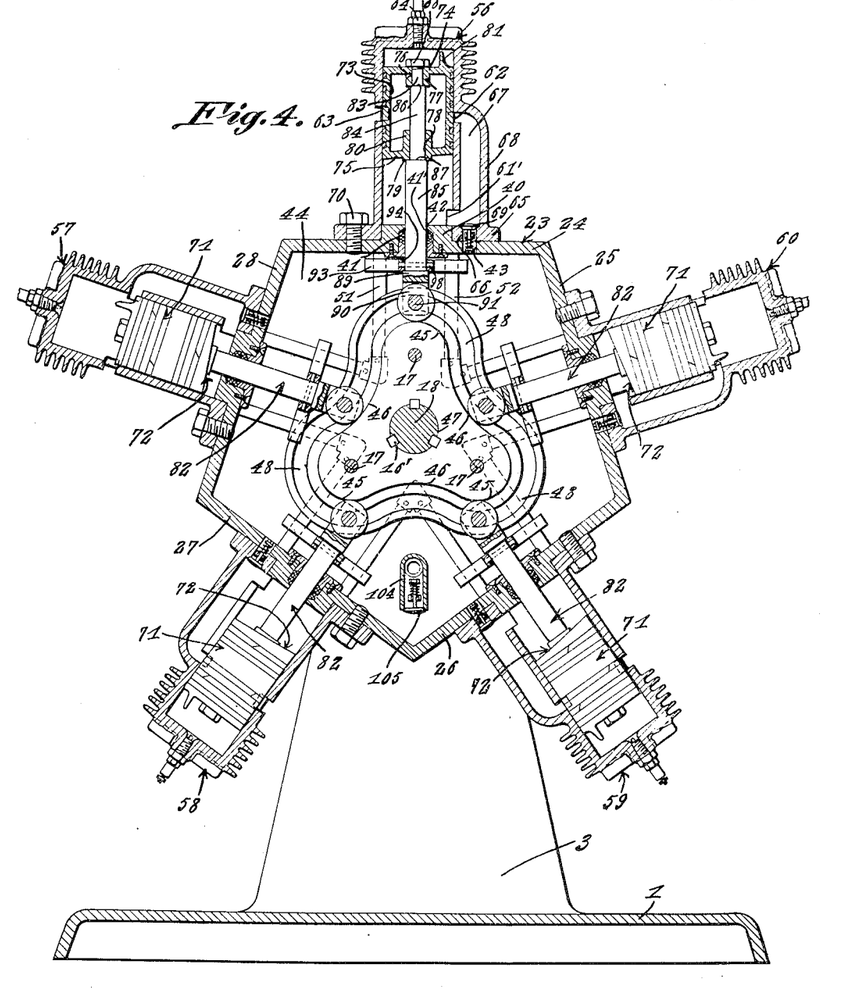
Figure 4 is a section on line 4—4, Figure 3.
Figure 5:
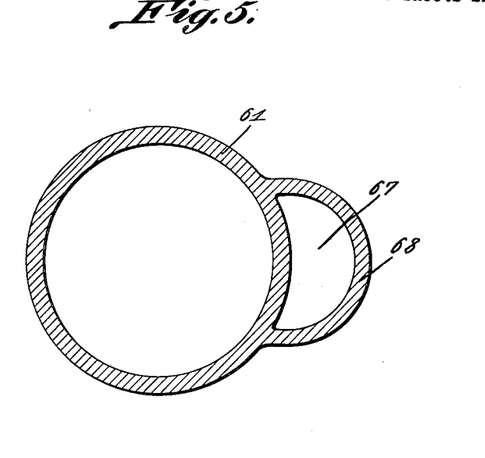
Figure 5 is a section on line 5—5, Figure 2.
Figure 6:
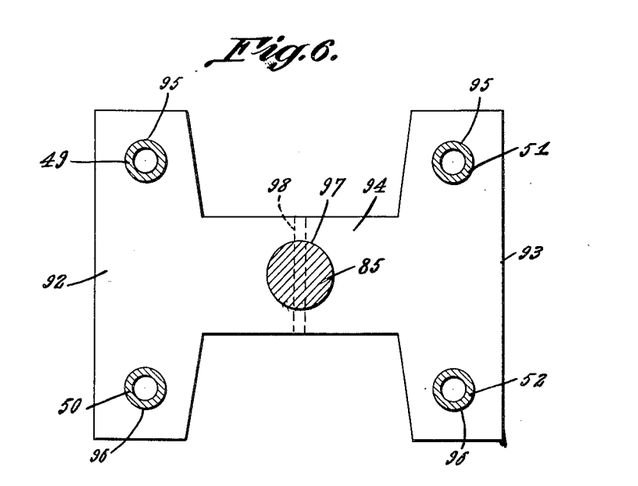
Figure 6 is a section on line 6—6, Figure 2.

Operating within each of the cylinders 61 is a piston referred to generally by the reference character 71 and which has a bevelled inner end 72. The construction of each of the pistons is best shown in Figure 4 and each piston is formed of a hollow cylindrical body portion 73 having an integral forward head 74 and an integral rear head 75, which is disposed at an inclination to form the bevelled rear end 72. The head 74, centrally thereof, has an opening 76 which registers with a collar 77 formed integral with the inner face of the head 74. The head 75, centrally thereof is provided with an opening 78, which registers with an annular flange 79 and a collar 80. The flange 79 is integral with the outer face of the head 75, and the collar 80 is integral with the inner face of said head and is of greater length than the flange 79. The collar 80 is of greater length than the collar 77, and the inner diameter of the latter is less than the inner diameter of the collar 80. The opening 76 is of less diameter than the opening 78. Formed integral with the outer face of the head 74 and eccentrically disposed thereon is a deflector 81.

Connected to each of the pistons 71 is a piston rod referred to generally by the reference character 82. The construction of the piston rod is best shown in Figure 4, and it comprises a forward end portion 83, an intermediate portion 84 and a rear end portion 85. The portion 83 is of a less diameter and length than the portion 84, and the latter is of less diameter and length than the portion 85. By setting up the piston rod 82 of different diameters, shoulders 86 and 87 are provided. The portion 83 of the piston rod extends through the opening 76 and collar 77, as well as projects forwardly from the head 75. When the piston rod 82 is mounted in position the shoulder 86 abuts against the collar 87 and the portion 83 carries a securing nut 88, which binds against the head 74. Further, when the piston rod 82 is in position, the portion 84 thereof extends through the opening 78, flange 79 and collar 80, and the shoulder 87 abuts against the flange 78. Further, when the piston rod 82 is in position the portion 85 thereof extends through the opening 42 and pocket 41 and projects inwardly from a wall of the body portion 23. A packing 41' is arranged in the pocket 41.

The inner end of the portion 85 of the piston rod 82 has formed integral therewith a yoke 89 carrying a guide roller 90, which is mounted on a pin 91, and the latter is of a length to extend through to the yoke 89 and into the grooves 48 formed on the inner faces of the holding members 9, 10. The roller 90 travels between the members 9, 10 and rides against the curved edge of the coerce 8.

Fixedly secured to the portion 85 of the piston rod 82, and abutting against the yoke 89 is a guide member consisting of a pair of opposed arms 92, 93, connected together by an arm 94, and the latter is integral centrally with the opposed inner edges of the arms 92, 93. The arm 94 extends transversely with respect to a wall of the body portion 23 and the arms 92, 93 are disposed lengthwise with respect to said wall. The arm 92, as well as the arm 93, in proximity to each end, is provided with an opening, and said openings are indicated at 95, 96. The arm 94, centrally thereof, is provided with an opening 97.

The rods 49 and 52 of a pair of guide rods extend through the openings 96 in the arms 92, 93, and the rods 50, 51 of a pair of guide rods extend through the openings 95 in the arms 92, 93. The portion 85 of the piston rod 82 extends through the opening 97 in the arm 94 and the said arm 94 is fixedly secured to the said portion 85 by a pin 98, which extends through the arm 94 and also through the portion 85 of the piston rod 82. The guide member travels on the two pairs of guide rods which project inwardly from a wall of the body portion 23 during the reciprocation of the piston 71.

The head 30 of the revoluble casing is provided with an opening 99. The section 33 of the power transmitting shaft is provided with an opening 100 and leading from the latter to the opening 99 is a combustible mixture conducting pipe 101, whereby the mixture from the chamber 39 will be conducted to the chamber 44. The pipe 101 is flanged at each end, and the flange at one end is secured to the section 33 by the hold-fast devices 102, and the flange at the other end to the head 30 by the hold-fast devices 103. Connected to the head 30 and communicating with the chamber 44 is an inlet pipe 104 provided with a check valve 105.

The outer terminal part of the portion 19 of the shaft 6 is reduced, as at 105' and snugly fits in the annulus 5 as well as being secured therewith by the clamping screw 106.

It is thought in view of the simplicity of the construction of the engine that the operation thereof can be readily understood, however, it will be stated that the manner of setting up the driving elements with respect to the coerce is such as to compel and constrain the time of compression in rotation in a plurality of impulses from each driving element during each revolution, in conformity with the number of arcs on the coerce member, to increase the speed and power of the engine.

Each of the driving elements includes a valveless cylinder and with the piston functioning to control inlet and discharge from the cylinder. The portions of convex curvature of the edge of the coerce provide for the compression stroke and the portions of concave curvature of said edge provide for the exhaust and intake stroke of the piston.

It is thought that the many advantages of a rotary engine, of the internal combustion, multi-cylinder type, in accordance with this invention, can be readily understood, and although the preferred embodiment of the invention is as illustrated and described, yet it is to be understood that changes in the details of construction can be had which will fall within the scope of the invention as claimed.

What I claim is:—

1. In a rotary engine, a driven casing, a plurality of valveless, two cycle internal combustion driving elements therefor, fixedly secured to the periphery of the body portion thereof and bodily carried therewith and each including a reciprocatory element extending into the casing, a substantially triangular stationary coerce member enclosed by the casing and having its edge formed of alternately disposed concave and convex portions engaging and governing the operation of each of said elements to provide for a plurality of impulses from each of said devices during one revolution of the casing, a stationary support for said coerce member, valve controlled means for conducting a combustible mixture from said support to the interior of said casing, said casing having its body portion provided with valve controlled means for intermittently supplying said mixture from said casing to said devices, a plurality of connected sets of opposed pairs of guide rods arranged within and secured to said casing, said coerce extending between the opposed pairs of each set of rods, and a guide member fixed to each of said elements and travelling on the opposed pairs of rods of each set.

2. In a rotary engine, a driven casing, a plurality of valveless, two cycle internal combustion driving elements therefor, fixedly secured to the periphery of the body portion thereof and bodily carried therewith and each including a reciprocatory element extending into the casing, a substantially triangular stationary coerce member enclosed by the casing and having its edge formed of alternately disposed concave and convex portions engaging and governing the operation of each of said elements to provide for a plurality of impulses from each of said devices during one revolution of the casing, a pair of oppositely disposed holding members, each arranged against and projecting from one side of said coerce member and having the projecting portion thereof provided with means for maintaining said elements in contact with the edge of the coerce member, a stationary support for said coerce member, valve controlled means for conducting a combustible mixture from said support to the interior of said casing, said casing having its body portion provided with valve controlled means for intermittently supplying said mixture from said casing to said devices, a plurality of connected sets of opposed pairs of guide rods arranged within and secured to said casing, said coerce extending between the opposed pairs of each set of rods, and a guide member fixed to each of said elements and travelling on the opposed pairs of rods of each set.

3. In a rotary engine, a revolubly driven power transmitting casing including body portion having a head at each end provided with an outwardly directed tubular member forming a section of a power transmitting shaft, a plurality of internal combustion driving elements for and fixedly secured to and projecting from said casing, angularly disposed with respect to said tubular members and further bodily revolving with the casing, each of said driving elements including a cylinder having a piston operating therein and a piston rod extended from the piston, said casing having spaced apertured bosses on its periphery extending into and closing the inner ends of said cylinders, the apertures in said bosses being of materially less diameter than the inner diameter of said cylinders, said piston rods extending through said bosses into the casing, a permanently stationary coerce member surrounded by the casing and having its edge engaged directly by the inner ends of said piston rod and with said edge formed to govern the operation of each of said driving elements to provide for a plurality of impulses from each of said driving elements during one revolution of the casing, and a stationary support common to and extending through said shaft sections and coerce member.

4. In a rotary engine, a revolubly driven power transmitting casing including body portion having a head at each end provided with an outwardly directed tubular member forming a section of a power transmitting shaft, a plurality of internal combustion driving elements for and fixedly secured to and projecting from said casing, angularly disposed with respect to said tubular members and further bodily revolving with the casing, each of said driving elements including a cylinder having a piston operating therein and a piston rod extended from the piston, said casing having spaced apertured bosses on its periphery extending into and closing the inner ends of said cylinders, the apertures in said bosses being of materially less diameter than the inner diameter of said cylinders, said piston rods extending through said bosses into the casing, a permanently stationary coerce member surrounded by the casing and having its edge engaged directly by the inner ends of said piston rod and with said edge formed to govern the operation of each of said driving elements to provide for a plurality of impulses from each of said driving elements during one revolution of the casing, a stationary support common to and extending through said shaft sections and coerce member, and bearings interposed between each of said tubular members and said stationary support.

5. In a rotary engine, a revolubly driven power transmitting casing including body portion having a head at each end provided with an outwardly directed tubular member forming a section of a power transmitting shaft, a plurality of internal combustion driving elements for and fixedly secured to and projecting from said casing, angularly disposed with respect to said tubular members and further bodily revolving with the casing, each of said driving elements including a cylinder having a piston operating therein and a piston rod extended from the piston, said casing having spaced apertured bosses on its periphery extending into and closing the inner ends of said cylinders, the apertures in said bosses being of materially less diameter than the inner diameter of said cylinders, said piston rods extending through said bosses into the casing, a permanently stationary coerce member surrounded by the casing and having its edge engaged directly by the inner ends of said piston rod and with said edge formed to govern the operation of each of said driving elements to provide for a plurality of impulses from each of said driving elements during one revolution of the casing, a stationary support common to and extending through said shaft sections and coerce member, each of said shaft sections extending inwardly from a head of the casing, bearing means interposed between said shaft sections and said support, guide means fixed to said support and associated with said coerce member, and bearings interposed between the inner ends of said shaft sections and said guide means.

6. In a rotary engine, a revolubly driven power transmitting casing, a plurality of internal combustion driving elements for and fixedly secured to and projecting from the periphery of the body portion of said casing and further bodily revolving with the latter, each of said driving elements including a cylinder having a piston operating therein and a piston rod extended from the piston, said casing having spaced apertured bosses on its periphery extending into the inner ends of said cylinders for closing such ends, the apertures in said bosses being of materially less diameter than the said pistons, said piston rods extending through said bosses into the casing, a permanently stationary coerce member surrounded by the casing and having its edge engaged directly by the inner ends of said piston rod and with said edge formed to govern the operation of each of said driving elements to provide for a plurality of impulses from each of said driving elements during one revolution of the casing, said casing further including a pair of oppositely projecting tubular members providing a power transmitting shaft, a stationary supporting means common to and extending through said coerce member and said tubular members, bearings interposed between said members and said supporting means, each of said members closed at its outer end and one providing an inlet chamber for a combustible mixture, said supporting means having one end thereof formed with a channel leading from a source of combustible mixture supply and communicating with said chamber, and means coacting with said chamber for supplying the combustible charge to said driving elements.

7. In a rotary engine, a revolubly driven power transmitting casing, a plurality of internal combustion driving elements for and fixedly secured to and projecting from the periphery of the body portion of said casing and further bodily revolving with the latter, each of said driving elements including a cylinder having a piston operating therein and a piston rod extended from the piston, said casing having spaced apertured bosses on its periphery extending into the inner ends of said cylinders for closing such ends, the apertures in said bosses being of materially less diameter than the said pistons, said piston rods extending through said bosses into the casing, a permanently stationary coerce member surrounded by the casing and having its edge engaged directly by the inner ends of said piston rod and with said edge formed to govern the operation of each of said driving elements to provide for a plurality of impulses from each of said driving elements during one revolution of the casing, said casing further including a pair of oppositely projecting tubular members providing a power transmitting shaft, a stationary supporting means common to and extending through said coerce member and said tubular members, bearings interposed between said members and said supporting means, each of said members closed at its outer end and one providing an inlet chamber for a combustible mixture, said supporting means having one end thereof formed with a channel leading from a source of combustible mixture supply and communicating with said chamber, means coacting with said chamber for supplying the combustible charge to said driving elements, a guide element fixed to each side of said coerce member and projecting beyond the edge thereof, and bearing elements mounted on said supporting means and interposed between said guide elements and the inner ends of said tubular members.

8. In a rotary engine, a revolubly driven power transmitting casing having spaced apertured bosses on its periphery, a plurality of valveless internal combustion driving elements therefor fixedly secured to and projecting from the periphery of the body portion of the casing and further bodily carried with the latter, each of said elements including a cylinder having its inner end closed by an apertured boss, a piston and a piston rod fixed to the piston and extending through a boss into the casing with direct slidable engagement with the edge of a permanently stationary coerce member surrounded by the casing and having the edge thereof formed to govern the operation of each of said driving elements during the travel of the inner ends of the piston rods around said edge to provide for a plurality of impulses from each of said driving elements during one revolution of the casing, means secured to the coerce member and projecting from the edge thereof for maintaining the inner ends of the piston rods against the edge of said coerce member, a stationary supporting means common to and extending through said coerce member and casing, said casing provided with a pair of oppositely projecting tubular members surrounding said supporting means and providing a power transmitting shaft, and bearing elements interposed between said tubular members and said supporting means.

9. In a rotary engine, a revolubly driven power transmitting casing having spaced apertured bosses on its periphery, a plurality of valveless internal combustion driving elements therefor fixedly secured to and projecting from the periphery of the body portion of the casing and further bodily carried with the latter, each of said elements including a cylinder having its inner end closed by an apertured boss, a piston and a piston rod fixed to the piston and extending through a boss into the casing with direct slidable engagement with the edge of a permanently stationary coerce member surrounded by the casing and having the edge thereof formed to govern the operation of each of said driving elements during the travel of the inner ends of the piston rods around said edge to provide for a plurality of impulses from each of said driving elements during one revolution of the casing, means secured to the coerce member and projecting from the edge thereof for maintaining the inner ends of the piston rods against the edge of said coerce member, a stationary supporting means common to and extending through said coerce member and casing, said casing provided with a pair of oppositely projecting tubular members surrounding said supporting means and providing a power transmitting shaft, bearing elements interposed between said tubular members and said supporting means, and said supporting means, one of said tubular members and said casing having coacting means for supplying a combustible charge to said driving elements.

10. In a rotary engine, a revolubly driven power transmitting casing, a plurality of valveless internal combustion driving elements therefor fixedly secured on and projecting from the periphery of the body portion of the casing and further bodily carried with the latter, each of said elements including a cylinder, a piston and a piston rod, said body portion provided with outwardly projecting means for closing the inner end of each of the cylinders, said rod fixed to said piston and extending into said casing through said means for closing the inner end of a cylinder, said rod having direct slidable engagement with the edge, a permanently stationary coerce member surrounded by the casing and having the edge thereof formed to govern the operation of each of said driving elements during the travel of the inner ends of the piston rods directly around said edge to provide for a plurality of impulses from each of said driving elements during one revolution of the casing, said casing provided with a pair of oppositely projecting tubular members forming a power transmitting shaft, and a stationary supporting means common to and extending through said coerce member, casing and tubular members.

11. In a rotary engine, a revolubly driven power transmitting casing, a plurality of valveless internal combustion driving elements therefor fixedly secured on and projecting from the periphery of the body portion of the casing and further bodily carried with the latter, each of said elements including a cylinder, a piston and a piston rod, said body portion provided with means for closing the inner end of each of the cylinders, said rod fixed to said piston and extending into said casing through said means for closing the inner end of a cylinder, a permanently stationary coerce member surrounded by the casing and having the edge thereof directly engaged by said rods and formed to govern the operation of each of said driving elements during the travel of the inner ends of the piston rods directly around said edge to provide for a plurality of impulses from each of said driving elements during one revolution of the casing, said casing provided with a pair of oppositely projecting tubular members forming a power transmitting shaft, a stationary supporting means common to and extending through said coerce member, casing and tubular members, guide means secured to each side of the coerce member, projecting beyond the edge thereof and acting to permanently maintain the inner ends of the piston rods against the edge of the coerce member, bearing means interposed between the tubular members and said supporting means, and bearing means interposed between said guide means and the inner ends of said tubular members and mounted on said supporting means.

12. In a rotary engine, a revolubly driven power transmitting casing, a plurality of valveless internal combustion driving elements therefor fixedly secured on and projecting from the periphery of the body portion of the casing and further bodily carried with the latter, each of said elements including a cylinder, a piston and a piston rod, said body portion provided with means for closing the inner end of each of the cylinders, said rod fixed to said piston and extending into said casing through said means for closing the inner end of a cylinder, a permanently stationary coerce member surrounded by the casing and having the edge thereof directly engaged by said rods and formed to govern the operation of each of said driving elements during the travel of the inner ends of the piston rods directly around said edge to provide for a plurality of impulses from each of said driving elements during one revolution of the casing, said casing provided with a pair of oppositely projecting tubular members forming a power transmitting shaft, a stationary supporting means common to and extending through said coerce member, casing and tubular members, and said supporting means, inner ends of said cylinders, said casing and one of said tubular members having coacting means for supplying a combustible charge to said cylinders exteriorly of the body portion of the casing.

In testimony whereof, I affix my signature hereto.

HARRY A. PALMER.